(12) United States Patent
Fryer et al.

(10) Patent No.: US 9,383,143 B2
(45) Date of Patent: Jul. 5, 2016

(54) METALLIC THIN-FILM BONDING AND ALLOY GENERATION

(71) Applicant: Micro Cooling Concepts, Inc., Huntington Beach, CA (US)

(72) Inventors: Jack Merrill Fryer, Huntington Beach, CA (US); Geoff Campbell, Broomfield, CO (US); Brian S. Peotter, Costa Mesa, CA (US); Lloyd Droppers, Sunnyvale, CA (US)

(73) Assignee: Micro Cooling Concepts, Inc., Huntington Beach, CA (US)

( * ) Notice: Subject to any disclaimer, the term of this patent is extended or adjusted under 35 U.S.C. 154(b) by 0 days.

(21) Appl. No.: 14/497,113

(22) Filed: Sep. 25, 2014

(65) Prior Publication Data

US 2015/0083369 A1 Mar. 26, 2015

Related U.S. Application Data

(60) Provisional application No. 61/883,033, filed on Sep. 26, 2013.

(51) Int. Cl.
*B23K 20/00* (2006.01)
*F28D 1/03* (2006.01)
*B23K 20/02* (2006.01)
*B23K 20/24* (2006.01)

(52) U.S. Cl.
CPC ............ *F28D 1/0308* (2013.01); *B23K 20/002* (2013.01); *B23K 20/02* (2013.01); *B23K 20/023* (2013.01); *B23K 20/026* (2013.01); *B23K 20/24* (2013.01); *B23K 2201/14* (2013.01); *B23K 2203/10* (2013.01); *Y10T 137/8593* (2015.04)

(58) Field of Classification Search
None
See application file for complete search history.

(56) References Cited

U.S. PATENT DOCUMENTS

| 3,088,192 | A | * | 5/1963 | Turner | B23K 35/3033 228/182 |
| 3,131,460 | A | * | 5/1964 | Allen | 29/601 |
| 3,530,568 | A | * | 9/1970 | Owczarski | B23K 20/233 228/194 |
| 3,678,570 | A | * | 7/1972 | Paulonis | B23K 20/16 228/194 |
| 3,682,606 | A | * | 8/1972 | Anderson et al. | 428/593 |
| 3,711,936 | A | * | 1/1973 | Athey | B23K 20/023 228/193 |
| 3,789,498 | A | * | 2/1974 | Cole | 228/118 |
| 3,795,042 | A | * | 3/1974 | Kreider et al. | 228/190 |
| 3,936,277 | A | * | 2/1976 | Jakway | B23K 35/001 228/155 |

(Continued)

FOREIGN PATENT DOCUMENTS

EP 0091222 B1 10/1996
GB 2241914 A * 9/1991 ............. B23K 20/02

(Continued)

*Primary Examiner* — Kiley Stoner
(74) *Attorney, Agent, or Firm* — HolzerIPLaw, PC

(57) ABSTRACT

Diffusion bonding a stack of aluminum thin films is particularly challenging due to a stable aluminum oxide coating that rapidly forms on the aluminum thin films when they are exposed to atmosphere and the relatively low meting temperature of aluminum. By plating the individual aluminum thin films with a metal that does not rapidly form a stable oxide coating, the individual aluminum thin films may be readily diffusion bonded together using heat and pressure. The resulting diffusion bonded structure can be an alloy of choice through the use of a carefully selected base and plating metals. The aluminum thin films may also be etched with distinct patterns that form a microfluidic fluid flow path through the stack of aluminum thin films when diffusion bonded together.

14 Claims, 3 Drawing Sheets

(56) References Cited

U.S. PATENT DOCUMENTS

| | | | |
|---|---|---|---|
| 3,936,920 A * | 2/1976 | Conn, Jr. | B23K 11/0093 228/181 |
| 3,937,387 A | 2/1976 | Fletcher et al. | |
| 3,950,841 A * | 4/1976 | Conn | B23K 11/0093 228/125 |
| 3,964,667 A * | 6/1976 | Anderson | 228/194 |
| 3,993,238 A * | 11/1976 | Brook et al. | 228/198 |
| 4,043,498 A * | 8/1977 | Conn, Jr. | B23K 11/0093 228/157 |
| 4,046,305 A * | 9/1977 | Brown et al. | 228/194 |
| 4,110,505 A * | 8/1978 | Prewo | 428/114 |
| 4,146,165 A * | 3/1979 | Lesgourgues | B23K 20/16 228/161 |
| 4,595,297 A * | 6/1986 | Liu | G01K 7/04 165/158 |
| 4,614,296 A * | 9/1986 | Lesgourgues | B22F 1/0003 228/119 |
| 4,838,474 A | 6/1989 | Ohashi et al. | |
| 4,890,784 A * | 1/1990 | Bampton | B23K 35/286 228/194 |
| 4,948,457 A | 8/1990 | Cooper et al. | |
| 4,978,054 A * | 12/1990 | Ferrando | B23K 20/16 228/120 |
| 5,009,359 A * | 4/1991 | Stover | B23K 20/14 228/121 |
| 5,165,591 A * | 11/1992 | Pratt | 228/193 |
| 5,224,645 A | 7/1993 | Cooper et al. | |
| 5,376,187 A | 12/1994 | Strickland et al. | |
| 5,980,658 A * | 11/1999 | Sukonnik et al. | 148/529 |
| 6,082,891 A * | 7/2000 | Schubert | B01F 5/0256 366/338 |
| 6,109,505 A * | 8/2000 | Malie | B23K 35/0244 228/119 |
| 6,264,900 B1 * | 7/2001 | Schubert | B01F 5/0256 138/38 |
| 6,321,998 B1 * | 11/2001 | Schubert | B01F 5/0256 239/430 |
| 6,440,496 B1 | 8/2002 | Gupta et al. | |
| 6,459,041 B1 | 10/2002 | Achari et al. | |
| 6,579,431 B1 | 6/2003 | Bolcavage et al. | |
| 6,886,736 B1 * | 5/2005 | Gubarev | B23K 20/023 219/617 |
| 8,225,481 B2 | 7/2012 | Kayser et al. | |
| 8,256,661 B2 * | 9/2012 | VanDyke et al. | 228/193 |
| 2001/0043892 A1 * | 11/2001 | Matsuoka | 422/211 |
| 2005/0023656 A1 * | 2/2005 | Leedy | 257/678 |
| 2009/0260794 A1 * | 10/2009 | Minami et al. | 165/182 |
| 2010/0266417 A1 | 10/2010 | Gorman et al. | |
| 2010/0297463 A1 * | 11/2010 | Hoffstaedter et al. | 428/573 |
| 2011/0108245 A1 | 5/2011 | Tan et al. | |
| 2012/0153464 A1 | 6/2012 | Hess et al. | |
| 2012/0202090 A1 | 8/2012 | Yamamoto et al. | |
| 2012/0261104 A1 * | 10/2012 | Kelly et al. | 165/177 |

FOREIGN PATENT DOCUMENTS

| | | | |
|---|---|---|---|
| JP | 01078688 A * | 3/1989 | |
| JP | 4211499 B2 * | 1/2009 | |
| WO | 2009106305 | 9/2009 | |

* cited by examiner

METALLIC THIN-FILM BONDING AND ALLOY GENERATION

CROSS-REFERENCE TO RELATED APPLICATIONS

The present application claims benefit of priority to U.S. Provisional Patent Application No. 61/883,033, entitled "Aluminum Thin-Film Bonding and Alloy Generation" and filed on 26 Sep. 2013, which is specifically incorporated by reference herein for all that it discloses or teaches.

This invention was made with government support under Order #NNX11CG15P awarded by the National Aeronautics and Space Administration (NASA)/Johnson Space Center (JSC). The government has certain rights in the invention.

BACKGROUND

Diffusion bonding is a solid-state fusing technique used in metalworking, which is capable of joining similar and dissimilar metals. More specifically, diffusion bonding utilizes solid-state diffusion to make atoms of two solid metallic surfaces intermingle and cross-link over time. Diffusion bonding is typically implemented by applying high pressure and/or temperature to the materials to be bonded and is commonly used to fuse alternating layers of thin metal foils.

Some metals (e.g., aluminum) readily generate a heat-resistant oxide coating when exposed to atmospheric air. This oxide coating may interfere with effective diffusion bonding of the thin metal foils together. This is especially problematic when the metal has a relatively low melting temperature, such as aluminum, which limits the quantity of heat that can be added during diffusion bonding while preserving any fine features within the individual metal components. As a result, such metals are not typically diffusion bonded unless they are alloyed with other metals that resist oxidation and/or increase melting temperature before the diffusion bonding process.

SUMMARY

Implementations described and claimed herein address the foregoing problems by providing a method of diffusion bonding a stack of aluminum thin films comprising: plating each of the aluminum thin films with another metal; and applying one or both of heat and pressure to the stack of plated aluminum thin films for a time period sufficient to diffusion bond the aluminum thin films together and distribute the metal plating evenly throughout the aluminum thin films.

Implementations described and claimed herein further address the foregoing problems by providing an aluminum thin film structure comprising: two or more aluminum thin films compressed together to form a stack of thin films, wherein each of the aluminum thin films is plated with another metal, and wherein each of the aluminum thin films has a distinct etched pattern therein forming a microfluidic fluid flow path through the stack of thin films.

Implementations described and claimed herein still further address the foregoing problems by providing a method of diffusion bonding a stack of metallic thin films comprising: etching a distinct pattern into each of the metallic thin films; plating each of the metallic thin films with another metal; arranging the etched and plated metallic thin films in an ordered and aligned stack, wherein the distinct patterns etched into the metallic thin films forms a microfluidic fluid flow path through the stack of metallic thin films; and applying one or both of heat and pressure to the stack of metallic thin films for a time period sufficient to diffusion bond the metallic thin films together and distribute the metal plating evenly throughout the metallic thin films.

Other implementations are also described and recited herein.

BRIEF DESCRIPTIONS OF THE DRAWINGS

DETAILED DESCRIPTIONS

The presently disclosed technology utilizes a plating process to prevent substantial oxidation of the underlying metal substrate. Further, the plating material and thickness may be chosen such that a desired alloy is generated from the substrate material and plating material after the diffusion bonding process described in detail below is complete.

Figure 1:
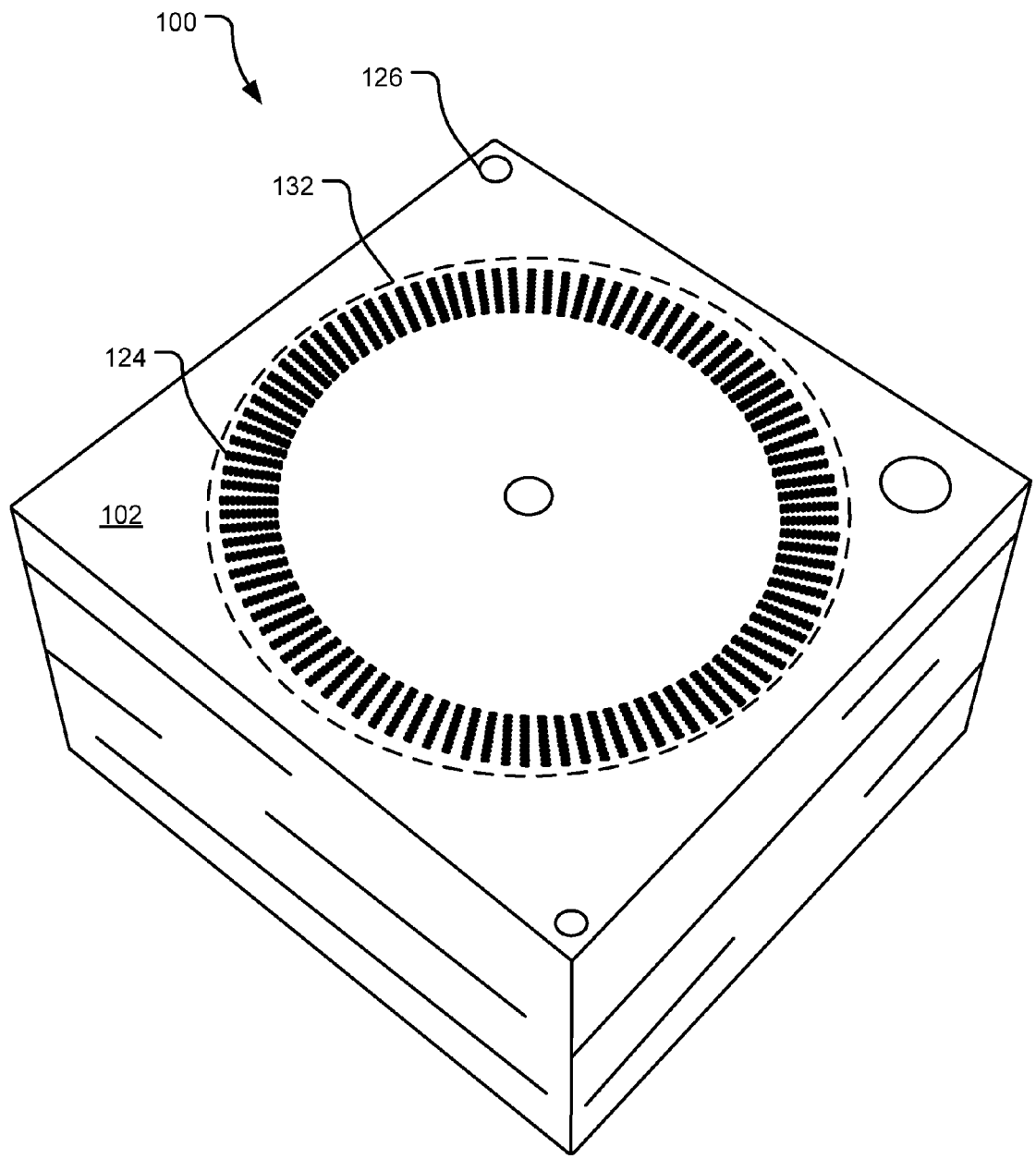
FIG. 1 illustrates a perspective view of a thin-film bonded structure.

FIG. 1 illustrates a perspective view of a thin-film bonded structure 100. The structure 100 is comprised of a plurality of stacked metallic thin film layers or foils (e.g., top layer 102). Some or all of the thin film layers within the structure 100 includes a pattern of etched voids (e.g., void 124). The etched voids may extend partially or fully through the individual thin film layers. In one implementation, the voids in the individual thin film layers of the structure 100 may create a precise and convoluted flow path for a fluid through the structure 100. For example, if the structure 100 is to be used as a heat exchanger, the voids in the individual thin film layers create a desired flow path through the structure 100 when the individual thin film layers are stacked to form the structure 100. Other implementations may utilize the voids in the individual thin film layers for other purposes, such as weight reduction.

An array of voids within the individual thin film layers may be very small and precise (i.e., fine features). For example, the fine features have a lateral dimension (i.e., within the plane of an individual thin film) of less than 100 microns and a depth dimension (i.e., normal to the plane of an individual thin film) of less than 25 microns, or half the thickness, or less, of the individual thin film. In some implementations, the fine features form microfluidic fluid flow paths through a stack of thin film layers. In other implementations, the fine features can be used to remove unnecessary material from the stack of thin film layers, thereby lightening a resulting part. The fine features may also be used to creating insulating layers within the stack of thin film layers. The fine features may also be used to create other patterns or structures within the part (e.g., bolt patterns, threads, etc.). These fine features may be referred to herein as microstructures. In various implementations, the individual thin film layers are 25-800 microns thick and the structure 100 is made of any number of stacked individual thin film layers to achieve an overall part thickness.

Prior to performing a diffusion bonding process (e.g., operations 300 of FIG. 3), the thin film layers of the structure 100 are stacked and compressed together to hold them in place and aid the diffusion bonding process. In one implementation, bolts (not shown) extend through one or more holes (e.g., hole 126) in the structure 100 and compress the structure 100 between two pressure plates (not shown, see e.g., plates 228, 230 of FIG. 2). After the diffusion bonding operations are complete, the bolts and pressure plates are removed from the bonded structure 100. In various implementations, the diffusion bonding operations form a hermetic seal between internal passages within the structure 100 formed by the etched voids and an outside environment.

In some implementations, the structure 100 is also machined after the bonding operations to reduce the overall size and change the shape of the structure 100 and form a final part. For example, the structure 100 may be machined into a cylindrical shape with a diameter outside the pattern of etched voids, as illustrated by dotted line 132. In one implementation, the machining occurs just outside of the outer-most voids that are etched in the structure 100. In various implementations, the machined structure 100 yields a final part that may be used as a heat exchanger, fluid injector, fluid combustor, or other parts having finely tuned fluid paths.

Figure 2:
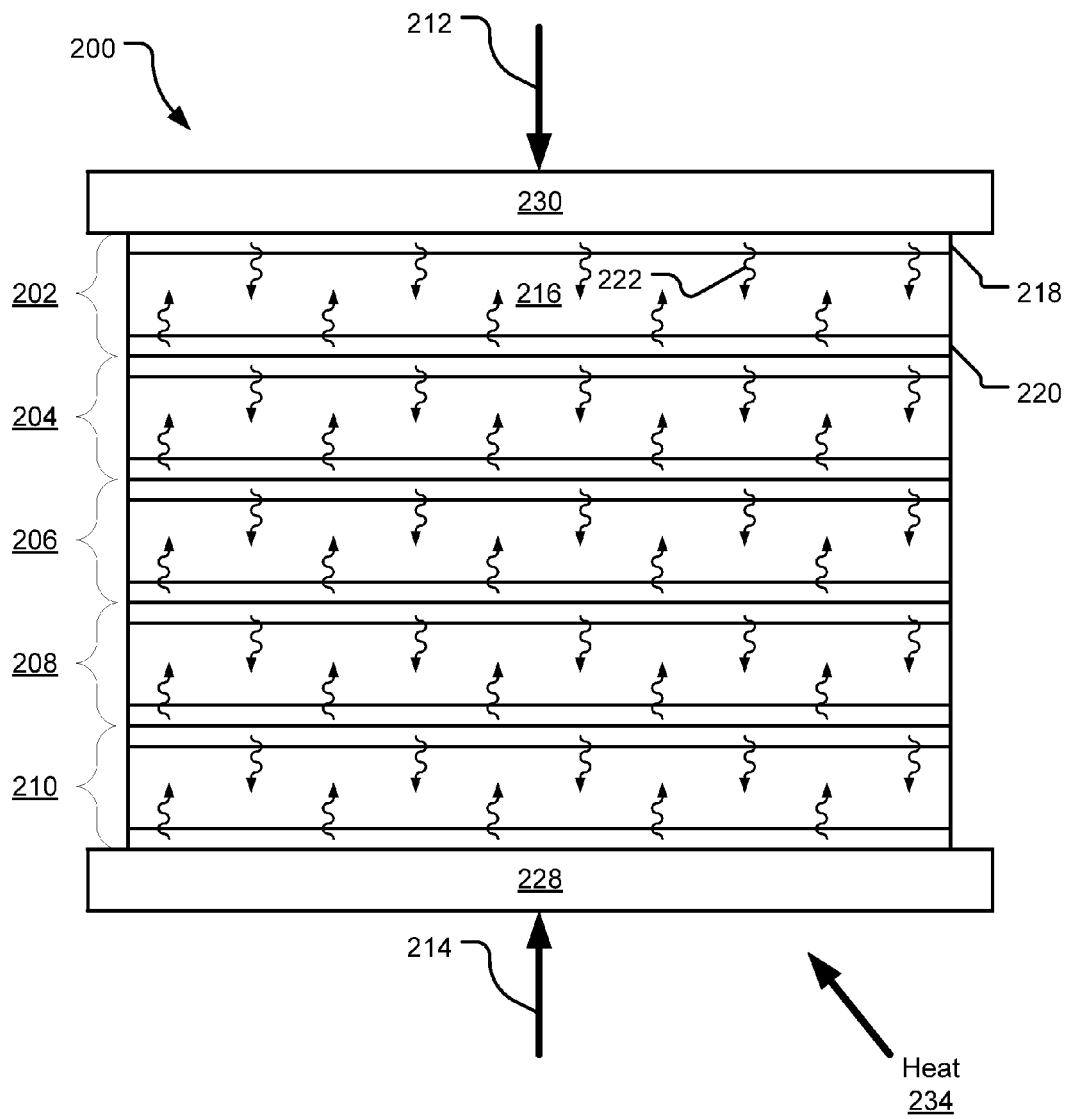
FIG. 2 illustrates an example schematic cross-section of a thin-film bonding fixture.

FIG. 2 illustrates an example schematic cross-section of a thin-film bonding fixture 200. The fixture 200 includes a stack of plated thin-films 202, 204, 206, 208, 210 compressed between compression plates 228, 230. The compression plates 228, 230 may be component of a press or other device used to maintain a desired compression on the plated thin-films 202, 204, 206, 208, 210 during a diffusion bonding process (e.g., operations 300 of FIG. 3), as illustrated by arrows 212, 214.

Each of the plated thin-films 202, 204, 206, 208, 210 includes a substrate metal (e.g., substrate 216) and metal plating on one or both planar surfaces of the substrate metal (e.g., plating 218, 220). Each of the substrate metal and the metal plating may include substantially a single metal (e.g., greater than 99% purity) or an alloy of two or more metals. Further, a ratio between the thickness of the metal substrate and the metal plating is selected so that a desired alloy is achieved after the diffusion bonding process is complete.

More specifically, a determined quantity of heat 234 and/or pressure (as illustrated by arrows 212, 214) is applied to the fixture 200. This causes metal atoms within the metal plating to fuse with adjacent metal plating in an adjacent plated thin-film. Further, wavy arrows (e.g., wavy arrow 222) illustrate that the metal atoms within the metal plating also diffuse inward into the metal substrate to achieve a substantially homogeneous alloy. In one implementation, a homogeneous alloy is one with less than 1% deviation in a desired % by mass between the substrate metal and the plating metal throughout the thickness of the diffusion bonded structure. In another implementation, a homogeneous alloy is one with less than 0.3% mass deviation in the plating metal(s) and less than 2% deviation in the substrate metal(s) throughout the thickness of the diffusion bonded structure. This alloy is made up of the substrate metal and the plating metal at a ratio defined by the thickness ratio between the metal substrate and the metal plating and the relative number of metal layers within the fixture 200. As a result, an exact desired alloy may be created that may not otherwise be readily available.

In various implementations, the substrate thin-films are made of a metal that is a desired component of a final alloy, but may be difficult to directly diffusion bond to an adjacent thin-film, for example, due to a rapidly forming stable oxide layer (e.g., aluminum and magnesium). More specifically, a variety of commercially available alloys may be used to form the thin-films (e.g., 1100, 2024, 5052, 6061, 7075 aluminum alloys). Other metals may also constitute the thin-films 202, 204, 206, 208, 210. The substrate thin-films may range from 25 to 500 microns thick and any number of the metal thin-films may be provided in order to achieve a desired overall thickness in conjunction with the plating thickness discussed below.

In an implementation where the substrate thin-films are aluminum, plating protects the thin-film surfaces from developing a layer of aluminum oxide. Aluminum oxides are very stable and can prevent interlayer grain growth, which prevents a good diffusion-bond from occurring. The plating does not have such a stable oxide layer, and may go into solution during the diffusion-bonding process, which aids the diffusional bonding of the overall structure.

In various implementations, the plating is a metal that is also a desired component of a final alloy and also readily diffusion bonds to adjacent plating, for example, due to a slowly forming and/or unstable oxide layer (e.g., copper, silver, nickel, manganese, chromium, and zinc). In some implementations, multiple layers of plating may be applied to a thin-film surface. Other metals may also constitute the plating. In an example implementation, the plating may range from 0.1 to 50 microns thick.

In another implementation, the plated thin-films 202, 204, 206, 208, 210 may be diffusion bonded to a thicker monolithic metal plate (not shown). For example, a number of copper-plated aluminum thin-film layers (e.g., 50 thin-films) could be diffusion bonded to a thicker nickel foil for corrosion resistance. In another example implementation, the copper-plated aluminum thin-film layers could be bonded to a machined metal structure (e.g., copper, nickel, or other metal alloys).

In yet another implementation, thin sheets of the alloying material may be used instead of or in addition to the metal plating to create a desired alloy. More specifically, 20 mil aluminum sheets may be stacked with 0.4 mil copper sheets and then diffusion bonded together. In some implementations, the 20 mil aluminum sheets may also have a 0.2 mil plating of copper as well.

Figure 3:
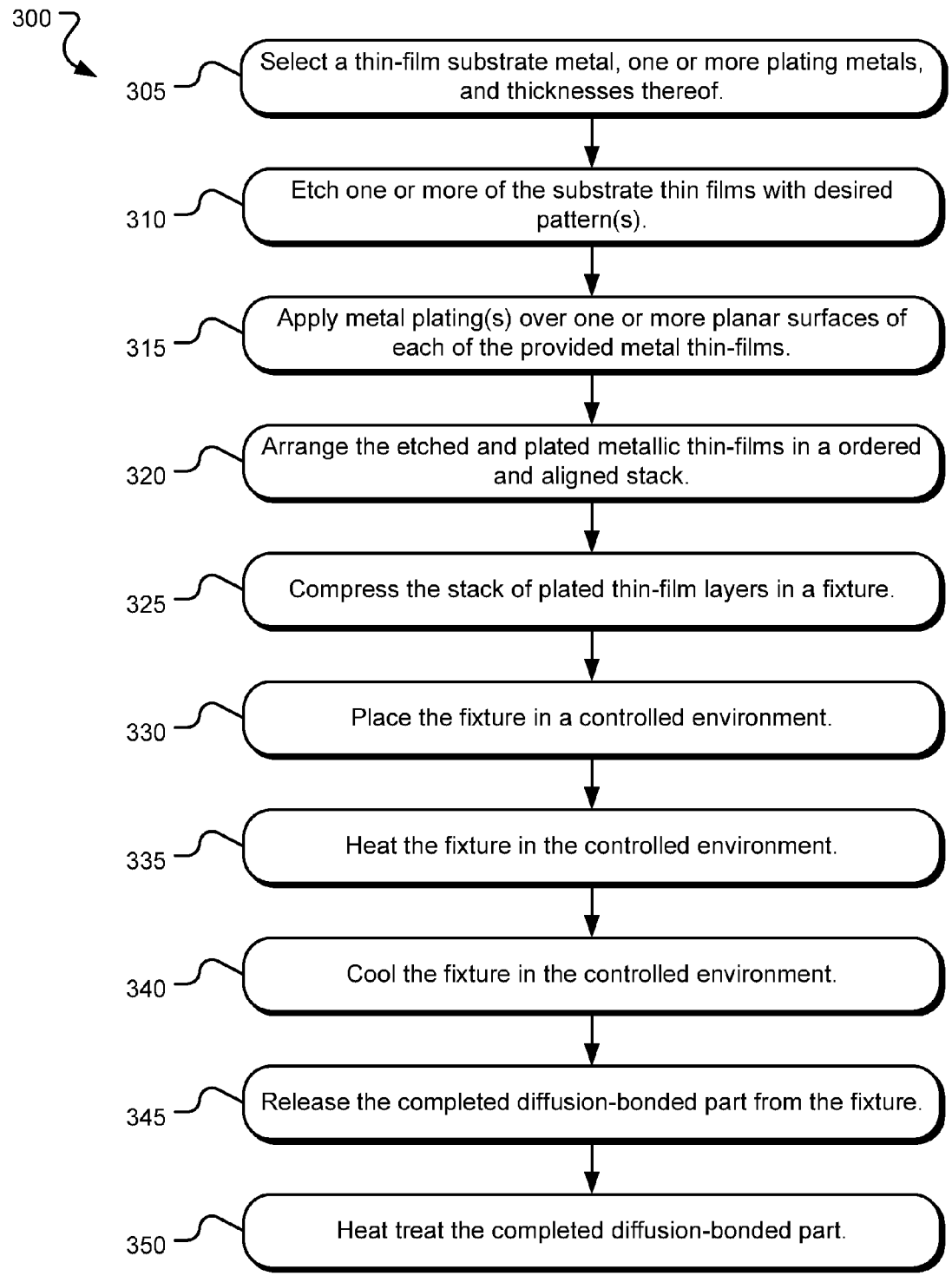
FIG. 3 illustrates example operations for bonding a plurality of aluminum thin-films together and generating a desired alloy.

FIG. 3 illustrates example operations 300 for bonding a plurality of aluminum thin-films together and generating a desired alloy. A selecting operation 305 selects a thin-film substrate metal, one or more plating metals, and thicknesses thereof. The substrate and plating metals and thickness are selected such that a homogeneous mixture of the total substrate and plating metal volumes yields a desired alloy after completion of the operations 300. The desired alloy is selected based on desired finished part performance requirements, as well as availability and cost of the selected constituent substrate and plating metals.

Further, the order of layering the plating metal(s) on the substrate metal may be selected based on the metal oxidation rates and oxide stability. More specifically, metals that oxidize rapidly and/or yield relatively stable oxides are selected as the substrate and/or interior plating. Since these metals are quickly covered by one or more additional metals in a controlled environment, the opportunity for oxidation is reduced or eliminated. Metals that oxidize slowly and/or yield relatively unstable oxides are selected as exterior plating. Since the outer layer oxides are slow to form and are broken down easily, these oxides do not create a significant barrier to diffusion boding if the diffusion bonding occurs within a reasonable time frame based on the oxidation rate of plating.

An etching operation 310 etches one or more of the substrate thin films with desired pattern(s). In various implementations, distinct patterns are partially and/or fully etching into different substrate thin films within a stack of thin films. In some implementations, the etched patterns form a desired flow path through the stack of etched thin films. In other implementations, the etching operation 310 is omitted. An applying operation 315 applies metal plating(s) over one or more of the planar surfaces of the provided metal thin-films. The applying operation 315 may be accomplished using any convenient plating process (e.g., electroplating, electroless plating, vapor deposition, and/or sputter deposition). In some implementations, a chemical etch is applied to the metal-thin-films to remove any oxides in preparation for the applying operation 315. In some implementations, the applying operation 315 is performed prior to the etching operation 310. This may occur when there is a concern with coolant compatibility with the resulting alloy or material property changes due to the alloying effect.

An arranging operation 320 arranges the etched and plated metallic thin-films in an ordered and aligned stack. In some implementations, the arranging operation 320 creates a desired flow path through the stack of etched thin films when the individual etched thin films are stacked in order and properly aligned. A compression operation 325 compresses the stack of thin-film layers in a fixture. In some implementations, the fixture uses compression screws to establish a predetermined compression magnitude on the stack of plated thin-film layers. In other implementations, the fixture utilizes a press to maintain the predetermined compression magnitude on the stack of plated thin-film layers.

A placing operation 330 places the fixture in a controlled environment. In an example implementation, the controlled environment is a vacuum (or near-vacuum) chamber. Substantially all air is pumped out of the chamber prior to heating operation 335 discussed in detail below. In some implementations, a quantity of process gas (e.g., argon or hydrogen-argon) is added to the vacuum chamber to assist the diffusion bonding process (e.g., allow for increased temperature processing). In various implementations, 200-800 microns/Hg of process gas is added to the evacuated chamber.

The heating operation 335 heats the compressed stack of plated thin-film layers within the controlled environment at a predetermined temperature for a predetermined time period. The compression magnitude, temperature, and/or time period for the heating operation 335 are carefully selected to achieve both diffusion bonding of the plated thin-films and substantial diffusion of the plating material into the substrate thin-film material, thus creating a substantially homogeneous diffusion bonded alloy. The compression magnitude, temperature, and time period are also selected such that the plated thin-film layers diffusion-bond, but do not melt together.

In some implementations, the heating operation 335 follows a heating temperature schedule and/or a compression magnitude schedule that defines the heating operation 335 over the predetermined time period. The heating temperature schedule may ramp up over time with a peak that nears, but does not exceed the melt temperature of the underlying metallic thin-films. The compression magnitude schedule may ramp down over time as the plated thin-film layers become soft near the melt temperature. In an example implementation, the predetermined compression magnitude ranges from 0.5-4 kpsi, the predetermined temperature ranges from 450-600 degrees Celsius, and the determined time period ranges from 20-120 minutes.

A cooling operation 340 cools the fixture within the controlled environment for a determined time period. In an example implementation, the cooling operation 340 follows a cooling temperature schedule over the predetermined time period. Once the fixture is sufficiently cooled, a releasing operation 345 releases the completed diffusion-bonded part from the fixture. The completed diffusion-bonded part is now substantially homogeneous and has composition of the desired alloy. Any etched fluid paths through the stack of etched thin films remain in the completed diffusion-bonded part.

A heat-treating operation 350 treats the completed diffusion-bonded part to enhance a desired performance characteristic(s) of the completed part. The heat-treating operation 350 utilizes one or more techniques (e.g., annealing, case hardening, precipitation strengthening, tempering, and quenching) to harden or soften the complete diffusion-bonded part as desired for the intended application of the complete diffusion-bonded part. In an example implementation, the completed part is annealed at 450-550 degrees Celsius to increase tensile strength of the completed part. In some implementations, the heat-treating operation 350 is not needed and thus omitted.

The logical operations making up the embodiments of the invention described herein are referred to variously as operations, steps, objects, or modules. Furthermore, it should be understood that logical operations may be performed in any order, adding and/or omitting operations as desired, unless explicitly claimed otherwise or the claim language inherently necessitates a specific order.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method of diffusion bonding a stack of aluminum films comprising:
    etching a distinct pattern into each of the aluminum films;
    plating each of the aluminum films with another metal; and
    applying one or both of heat and pressure to the stack of plated aluminum films for a time period sufficient to diffusion bond the films together and achieve a substantially homogenous alloy, wherein the distinct patterns form a microfluidic fluid flow path through the stack of aluminum films.

2. The method of claim 1, wherein the metal plating includes one or more of copper, silver, nickel, manganese, chromium and zinc.

3. The method of claim 1, wherein the aluminum films are each made of an aluminum alloy.

4. The method of claim 1, wherein the distinct patterns etched into the aluminum films form a microstructure within the stack of aluminum films.

5. The method of claim 1, wherein the metal plating forms an oxide at a slower rate than the aluminum films.

6. The method of claim 1, wherein the metal plating forms a less stable oxide than the aluminum films.

7. The method of claim 1, wherein the diffusion bonded films forms an alloy distinct from the aluminum films and the metal plating.

8. The method of claim 1, wherein both heat and pressure is applied to the stack of plated aluminum to diffusion bond the films together.

9. The method of claim 1, wherein decreasing pressure is applied to the stack of plated aluminum films during the diffusion bonding time period.

10. The method of claim 1, wherein increasing heat is applied to the stack of plated aluminum films during the diffusion bonding time period.

11. The method of claim 1, further comprising:
    bonding the stack of films to a monolithic metal plate.

12. A method of diffusion bonding a stack of metallic films comprising:
    etching a distinct pattern into each of the metallic films;
    plating each of the metallic films with another metal;
    arranging the etched and plated metallic films in an ordered and aligned stack, wherein the distinct patterns etched into the metallic films forms a microfluidic fluid flow path through the stack of metallic films; and applying one or both of heat and pressure to the stack of metallic films for a time period sufficient to diffusion bond the metallic films together and achieve a substantially homogenous alloy.

13. The method of claim 12, wherein the metal plating includes one or more of copper, silver, nickel, manganese, chromium, and zinc.

14. The method of claim 12, wherein the metallic films are each made of one or both of aluminum and magnesium.

* * * * *